(12) United States Patent
Yim et al.

(10) Patent No.: US 10,810,294 B2
(45) Date of Patent: Oct. 20, 2020

(54) DISPLAY DEVICE

(71) Applicant: SAMSUNG DISPLAY CO., LTD., Yongin-si, Gyeonggi-Do (KR)

(72) Inventors: Dale Yim, Suwon-si (KR); Hosuk Maeng, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/243,581

(22) Filed: Jan. 9, 2019

(65) Prior Publication Data

US 2019/0251324 A1    Aug. 15, 2019

(30) Foreign Application Priority Data

Feb. 12, 2018    (KR) .......................... 10-2018-0017005

(51) Int. Cl.
*G06F 21/32*    (2013.01)
*G09C 5/00*    (2006.01)
(Continued)

(52) U.S. Cl.
CPC ............ *G06F 21/32* (2013.01); *G06F 21/602* (2013.01); *G06K 9/00067* (2013.01); *G09C 5/00* (2013.01);
(Continued)

(58) Field of Classification Search
CPC .......................... G06K 9/00–0012; G09C 5/00
See application file for complete search history.

(56) References Cited

U.S. PATENT DOCUMENTS 9,280,650 B2 *   3/2016   Waldron ................. G06F 21/32
9,710,630 B2 *   7/2017   Kim ..................... G06F 21/32
(Continued)

FOREIGN PATENT DOCUMENTS

CN           104751154        7/2015
KR     10-2013-0047395        5/2013
(Continued)

OTHER PUBLICATIONS

European Search Report dated Mar. 19, 2019 issued in corresponding European Patent Application No. 19155415.3 (9 pages).
(Continued)

*Primary Examiner* — Patrick F Marinelli
(74) *Attorney, Agent, or Firm* — F. Chau & Associates, LLC

(57) ABSTRACT

A display device includes a plurality of pixels, a plurality of gate signal lines extending in a first direction and connected to the plurality of pixels, and a plurality of data signal lines extending in a second direction and connected to the plurality of pixels. The second direction crosses the first direction. The display device further includes a fingerprint sensor configured to detect fingerprint information, and a driver integrated circuit (IC) configured to transmit a plurality of scan signals to the pixels via the gate signal lines, transmit a plurality of data signals to the pixels via the data signal lines, receive the fingerprint information from the fingerprint sensor, and encrypt the received fingerprint information. The display device further includes an application processor configured to receive the encrypted fingerprint information from the driver IC.

20 Claims, 18 Drawing Sheets

(51) Int. Cl.

| | | |
|---|---|---|
| *H04L 9/06* | (2006.01) | |
| *H04L 9/32* | (2006.01) | |
| *H04N 21/422* | (2011.01) | |
| *G06K 9/00* | (2006.01) | |
| *G06F 21/60* | (2013.01) | |
| *H04L 9/30* | (2006.01) | |
| *G09G 3/20* | (2006.01) | |

(52) U.S. Cl.
CPC ......... *G09G 3/2003* (2013.01); *H04L 9/0643* (2013.01); *H04L 9/30* (2013.01); *H04L 9/3231* (2013.01); *H04N 21/42201* (2013.01); *G06K 9/0002* (2013.01); *G06K 9/0004* (2013.01); *G06K 2009/00953* (2013.01)

(56) References Cited

U.S. PATENT DOCUMENTS

| | | | | |
|---|---|---|---|---|
| 2003/0140235 | A1* | 7/2003 | Immega | G06F 21/32 713/186 |
| 2013/0198826 | A1* | 8/2013 | Waldron | G06F 21/32 726/6 |
| 2014/0301614 | A1* | 10/2014 | Han | G06K 9/00013 382/124 |
| 2015/0116086 | A1* | 4/2015 | Kim | G06F 21/32 340/5.83 |
| 2015/0177884 | A1 | 6/2015 | Han | |
| 2015/0178543 | A1* | 6/2015 | Ivanov | G06K 9/00006 382/124 |
| 2017/0323146 | A1* | 11/2017 | Zhang | G06F 21/32 |
| 2019/0026534 | A1* | 1/2019 | Lin | H04L 9/3231 |
| 2019/0197288 | A1* | 6/2019 | Han | G06K 9/00013 |
| 2019/0251324 | A1* | 8/2019 | Yim | G06F 21/32 |
| 2019/0340414 | A1* | 11/2019 | Vaezi Joze | G06K 9/00006 |
| 2019/0373195 | A1* | 12/2019 | Minagawa | G06K 9/00577 |
| 2019/0384959 | A1* | 12/2019 | Lee | G06K 9/00006 |
| 2020/0012440 | A1* | 1/2020 | Wang | G06F 3/0641 |

FOREIGN PATENT DOCUMENTS

| | | |
|---|---|---|
| KR | 10-2015-0049550 | 5/2015 |
| KR | 10-2017-0065012 | 6/2017 |

OTHER PUBLICATIONS

Xiaolin, et al., "Research and Implementation of Image Encryption Algorithm Based on Zigzag Transformation and Inner Product Polarization Vector". 2010 IEEE International Conference on Granular Computing, IEEE Computer Science, pp. 556-561.

Liu, et al., "Image Block Encryption Algorithrn Based on Chaotic Maps", IET Signal Processing, 2018, vol. 12, Iss. 1, pp. 22-30>.

* cited by examiner

DISPLAY DEVICE

CROSS-REFERENCE TO RELATED APPLICATIONS

This application claims priority under 35 U.S.C. § 119 to Korean Patent Application No. 10-2018-0017005, filed on Feb. 12, 2018, the disclosure of which is incorporated by reference herein in its entirety.

TECHNICAL FIELD

Exemplary embodiments of the present disclosure relate generally to a display device, and more specifically, to a device and method which detect fingerprint information in a display panel, encrypt the fingerprint information using the display panel's own method, and then transmit the encrypted fingerprint information.

DISCUSSION OF THE RELATED ART

In a mobile device such as a smartphone, fingerprint data is typically detected by a fingerprint sensor located in the display, the bezel, or a button of the mobile device. The detected fingerprint data is transmitted to the application processor (AP) of the mobile device without encryption, and the transmitted fingerprint data is encrypted within the AP once received by the AP.

When user registration is performed for the purpose of, for example, user authentication or mobile payment using a mobile device, fingerprint information is registered but is not encrypted before being transmitted from the fingerprint sensor to the AP. For example, upon user authentication as well as the registration of fingerprint information, detected fingerprint information is transmitted to the AP without encryption. As a result, personal fingerprint information may be divulged and obtained by an unintended party.

SUMMARY

Exemplary embodiments of the present disclosure are directed to a device and method that recognize fingerprint information in a display panel, encrypt the fingerprint information by means of the display panel's own method, and then transmit the encrypted fingerprint information to an application processor.

According to an exemplary embodiment of the present disclosure, a display device includes a plurality of pixels, a plurality of gate signal lines extending in a first direction and connected to the plurality of pixels, and a plurality of data signal lines extending in a second direction and connected to the plurality of pixels. The second direction crosses the first direction. The display device further includes a fingerprint sensor configured to detect fingerprint information, and a driver integrated circuit (IC) configured to transmit a plurality of scan signals to the pixels via the gate signal lines, transmit a plurality of data signals to the pixels via the data signal lines, receive the fingerprint information from the fingerprint sensor, and encrypt the received fingerprint information. The display device further includes an application processor configured to receive the encrypted fingerprint information from the driver IC.

In a display device according to an exemplary embodiment, the fingerprint sensor is an optical sensor, a capacitive sensor, an ultrasonic sensor, or a heat sensor.

In a display device according to an exemplary embodiment, the driver IC converts the fingerprint information into an image, segments the image into a plurality of sub-blocks, selects an encryption option for each of the sub-blocks, and performs the selected encryption option on each of the sub-blocks.

In a display device according to an exemplary embodiment, the driver IC transmits the selected encryption option to the application processor.

In a display device according to an exemplary embodiment, the application processor decrypts the encrypted fingerprint information using the received encryption option.

In a display device according to an exemplary embodiment, the encryption option is one of a flip encryption option, a location change encryption option, a brightness change encryption option, a noise mix encryption option, a hashing encryption option, and a filtering encryption option.

In a display device according to an exemplary embodiment, the filtering encryption option utilizes one of a diffuse glow filter, a displace filter, a glass filter, a ripple filter, a pinch filter, a twirl filter, a wave filter, a zigzag filter, and a spherize filter.

In a display device according to an exemplary embodiment, the driver IC converts the fingerprint information into an image, encrypts the image using a public key, and transmits the encrypted image to the application processor.

In a display device according to an exemplary embodiment, the application processor decrypts the encrypted image using a private key.

In a display device according to an exemplary embodiment, the application processor re-encrypts the encrypted fingerprint information.

According to an exemplary embodiment of the present disclosure, a method of operating a display device includes transmitting, by a driver integrated circuit (IC) of the display device, a plurality of scan signals to a plurality of pixels via a plurality of gate signal lines. The method further includes transmitting, by the driver IC, a plurality of data signals to the pixels via a plurality of data signal lines. The gate signal lines extend in a first direction and are connected to the pixels, the data lines extend in a second direction and are connected to the pixels, and the second direction crosses the first direction. The method further includes detecting, by a fingerprint sensor of the display device, fingerprint information. The method further includes receiving, by the driver IC, the fingerprint information from the fingerprint sensor. The method further includes encrypting, by the driver IC, the received fingerprint information. The method further includes transmitting the encrypted fingerprint information from the driver IC to an application processor of the display device.

In a method according to an exemplary embodiment, the fingerprint sensor is an optical sensor, a capacitive sensor, an ultrasonic sensor, or a heat sensor.

In a method according to an exemplary embodiment, the driver IC converts the fingerprint information into an image, segments the image into a plurality of sub-blocks, selects an encryption option for each of the sub-blocks, and performs the selected encryption option on each of the sub-blocks.

In a method according to an exemplary embodiment, the driver IC transmits the selected encryption option to the application processor.

In a method according to an exemplary embodiment, the application processor decrypts the encrypted fingerprint information using the received encryption option.

In a method according to an exemplary embodiment, the encryption option is one of a flip encryption option, a location change encryption option, a brightness change encryption option, a noise mix encryption option, a hashing encryption option, and a filtering encryption option.

In a method according to an exemplary embodiment, the filtering option utilizes one of a diffuse glow filter, a displace filter, a glass filter, a ripple filter, a pinch filter, a twirl filter, a wave filter, a zigzag filter, and a spherize filter.

In a method according to an exemplary embodiment, the driver IC converts the fingerprint information into an image, encrypts the image using a public key, and transmits the encrypted image to the application processor.

In a method according to an exemplary embodiment, the application processor decrypts the encrypted image using a private key.

In a method according to an exemplary embodiment, the application processor re-encrypts the encrypted fingerprint information.

BRIEF DESCRIPTION OF THE DRAWINGS

The above and other features of the present disclosure will become more apparent by describing in detail exemplary embodiments thereof with reference the accompanying drawings, in which:

FIG. 5 is a cross-sectional view taken along line II-II' of FIG. 4.

DETAILED DESCRIPTION

Figure 1:
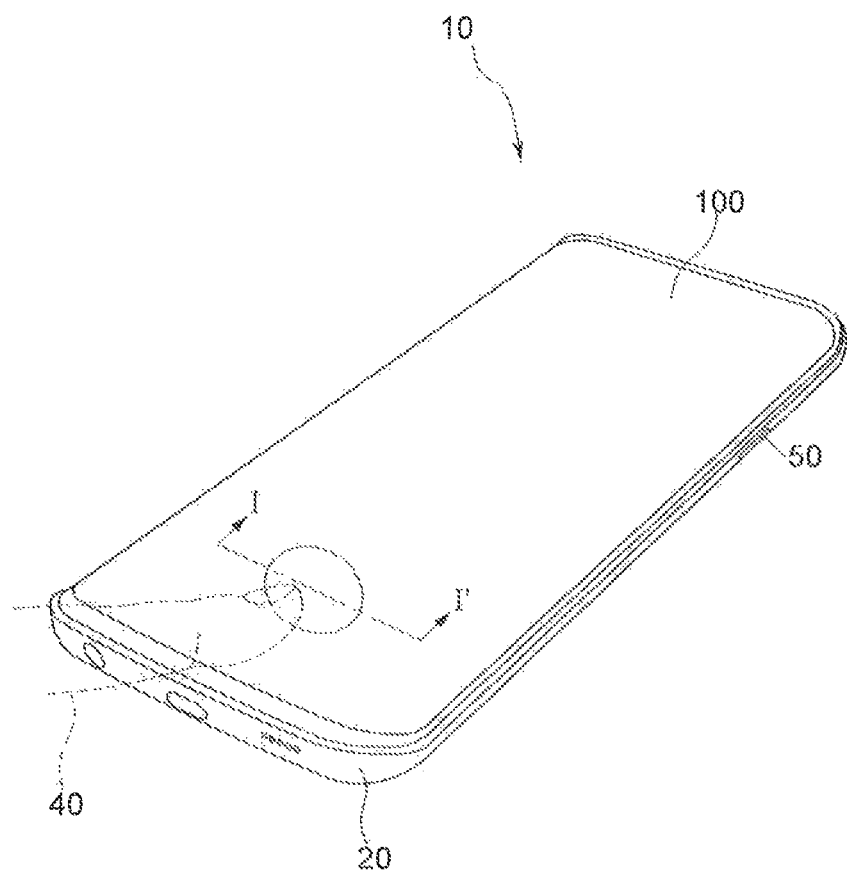
FIGS. 1 and 2 are a perspective view and a block diagram of a display device according to an exemplary embodiment of the present disclosure, respectively.

Exemplary embodiments of the present disclosure will be described more fully hereinafter with reference to the accompanying drawings. Like reference numerals may refer to like elements throughout the accompanying drawings.

Spatially relative terms, such as "below", "beneath", "lower", "above", "upper", etc., may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Accordingly, the exemplary term "below" can encompass both the orientations of above and below. The device may be also be oriented in another direction, and thus the spatially relative terms may be interpreted differently depending on the orientation.

Herein, a singular form may include a plural form as well, unless the context clearly indicates otherwise.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Figure 2:
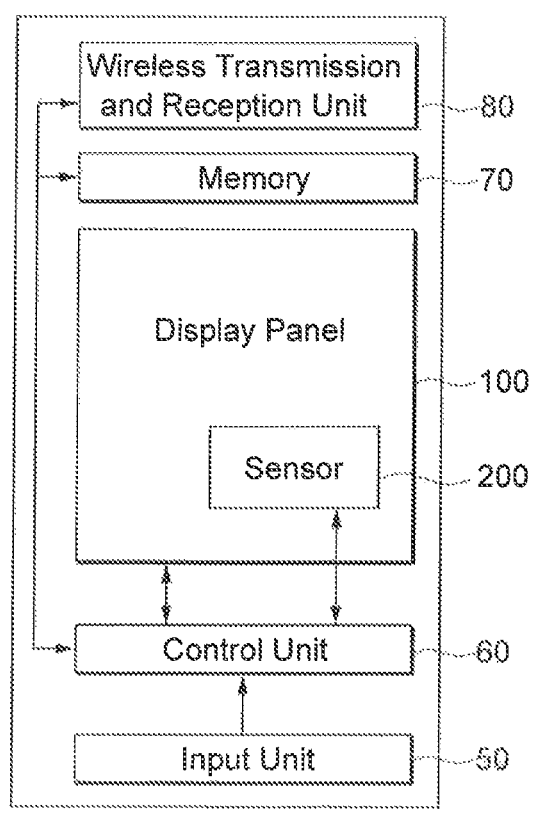

FIGS. 1 and 2 are a perspective view and a block diagram of a display device according to an exemplary embodiment of the present disclosure, respectively.

Referring to FIGS. 1 and 2, a display device 10 includes a housing 20, a control unit 60 fastened to the housing 20, an input unit 50, and a sensor 200. The sensor 200 may also be referred to herein as a fingerprint sensor 200. According to exemplary embodiments, the display device 10 may be a mobile wireless communication device such as, for example, a cellular phone, or another type of electronic device such as, for example, a tablet computer, a laptop computer, a wearable computer, etc.

Furthermore, a wireless transmission and reception unit 80 is fastened within the housing 20 and coupled to the control unit 60. The wireless transmission and reception unit 80 performs at least one wireless communication function on, for example, sound and/or data, in cooperation with the control unit 60. In exemplary embodiments, the display device 10 does not include the wireless transmission and reception unit 80 or another wireless communication circuit unit. The control unit 60 may include, for example, an application processor (AP) and a driver integrated circuit (IC).

The display panel 100 is fastened to the housing 20 and coupled to the control unit 60. The display panel 100 may also be referred to herein as a display layer 100 or a display region 100. The display panel 100 may be, for example, a light-emitting diode (LED) display. Furthermore, the display panel 100 may have an additional circuit unit configured to provide a touch display function.

A memory 70 is coupled to the control unit 60. The memory 70 stores, for example, finger matching biometric template data. The memory 70 may also store additional types of data.

The display panel 100 may be configured in the form of a touch display that functions as both an input device and a display. Furthermore, the display panel 100 may perform one or more functions in response to input in cooperation with the control unit 60. For example, the display panel 100 may turn the power of the display device 10 on or off, the display panel 100 may initiate communication via the wireless transmission and reception unit 80, and/or the display panel 100 may perform a menu function based on a touch input.

For example, in connection with the menu function, the control unit 60 may display a menu of available applications on the display panel 100 based on an input or press on the touch display. Furthermore, the input unit 50, which may be, for example, a push button switch, may be fastened to the housing 20.

The sensor 200 may be, for example, an optical sensor or capacitive touch sensor, which will be described later.

Figure 3A:
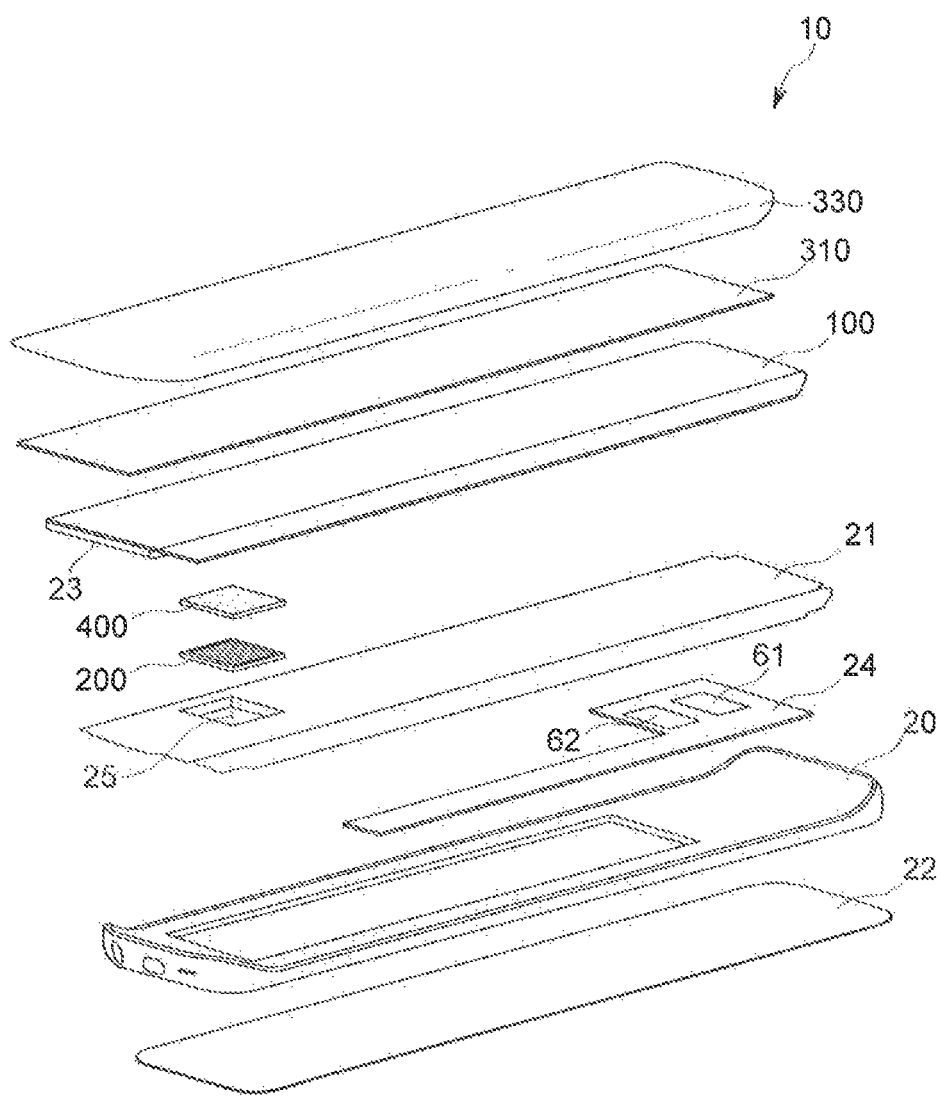
FIG. 3A is a schematic exploded perspective view of the display device shown in FIG. 1.
Figure 3B:
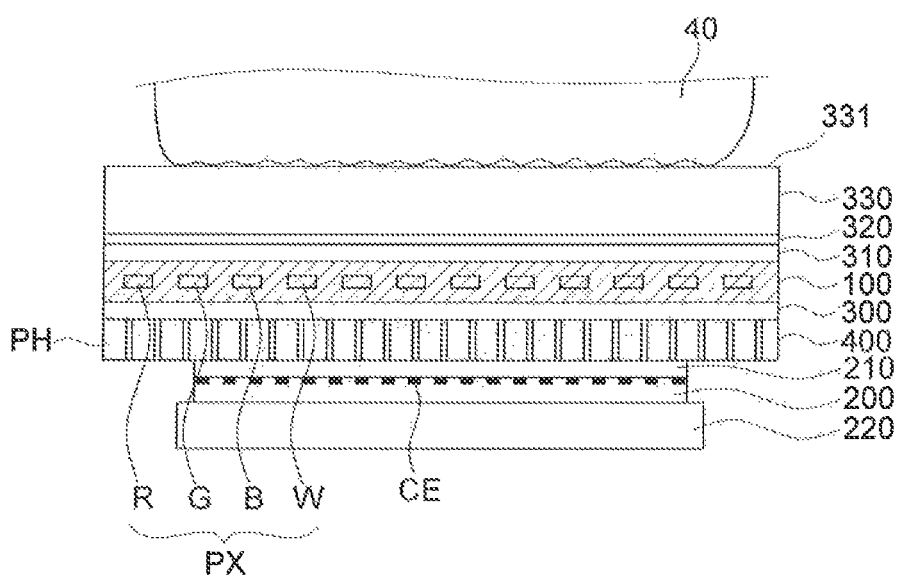
FIG. 3B is a cross-sectional view taken along line I-I' of FIG. 1.

FIG. 3A is a schematic exploded perspective view of the display device shown in FIG. 1. FIG. 3B is a cross-sectional view taken along line I-I' of FIG. 1. The display device 10 according to an exemplary embodiment of the present disclosure will be described in greater detail with reference to FIGS. 3A and 3B.

Referring to FIG. 3A, in an exemplary embodiment, the display device 10 includes a transparent cover layer 330, a touch detection layer 310, a display panel 100, a pin hole array mask layer 400, the sensor 200, a bracket 21, a printed circuit board (PCB) 24, the housing 20, and a back cover 22. According to an exemplary embodiment, the components may come into tight contact with each other or be partially separated from one another, and may then be stacked on top of one another.

The transparent cover layer 330 forms the front appearance of the display device 10, and defines a finger placement surface 331 configured to accommodate a finger 40. According to an exemplary embodiment, the transparent cover layer 330 may include a transparent material such as, for example, glass, so that content output via the display panel 100 is visible to the user. According to exemplary embodiments, parts of the circumference of the transparent cover layer 330 may be bent in a backward direction, and may form curved surfaces. FIG. 3A shows a state in which both side parts of the transparent cover layer 330 have curved surfaces.

The display panel 100 is disposed below the transparent cover layer 330, and may display various types of content. The display panel 100 may include a substrate, a plurality of pixels PXs disposed on one surface of the substrate, and one or more conductive lines electrically connected to the pixels PXs. The substrate may include a flexible material so that at least part (e.g., a bending portion 23) may be bent in a backward direction. The conductive lines may include one or more gate lines and one or more data lines. According to an exemplary embodiment, pluralities of gate lines and data lines may be arranged in a matrix form, and the pixels PXs are electrically connected to the gate lines and the data lines and are arranged at points at which the gate lines and the data lines intersect each other. The plurality of gate lines extends in a first direction, and the plurality of data lines extends in a second direction that crosses the first direction.

According to exemplary embodiments, the display panel 100 is connected to a display drive circuit. According to an exemplary embodiment, the display drive circuit is connected to the bending portion 23 of the display panel 100. The display drive circuit is electrically connected to the conductive lines. In an exemplary embodiment, the display drive circuit includes a driver IC 61 configured to provide drive signals and image signals to the display panel 100. In an exemplary embodiment, the display drive circuit includes a timing controller T-con configured to control the drive signals and the image signals. In an exemplary embodiment, the driver IC 61 includes a gate driver IC configured to sequentially select the gate signal lines of the display panel 100 and apply scan signals (also referred to as drive signals or gate signals), and a data driver IC (also referred to as source driver IC) configured to apply image signals (also referred to as data signals) to the data signal lines of the display panel 100. According to an exemplary embodiment, when the gate driver IC changes a corresponding pixel PX to an activated state by selecting the gate signal line and then applying a scan signal to the selected gate signal line, the data driver IC applies an image signal to the corresponding pixel PX via the data signal line. The timing controller may adjust the transmission time of signals to be transmitted to the driver IC, thereby preventing a display time difference which may occur during the process of image data being output to the display panel 100. In an exemplary embodiment, the driver IC 61 receives fingerprint information output from the sensor 200, converts the fingerprint information into fingerprint image data, and encrypts the fingerprint image data.

The pin hole array mask layer 400 is disposed on at least part of the back surface of the display panel 100. For example, in an exemplary embodiment, the pin hole array mask layer 400 is disposed at the center of the lower side of the display panel 100, and the sensor 200 is disposed on at least part of the back surface of the pin hole array mask layer 400. The pin hole array mask layer 400 and the sensor 200 will be described in further detail below.

In an exemplary embodiment, a size of the bracket 21 is identical or substantially similar to that of the transparent cover layer 330. The bracket 21 fastens and supports the display panel 100. According to an exemplary embodiment, at least part of the bracket 21 is surrounded by the bending portion 23 of the display panel 100. For example, in an exemplary embodiment, the overall display panel 100 except for the bending portion 23 is disposed on the front surface of the bracket 21, and the bending portion 23 of the display panel 100 may be bent and surround one side surface of the bracket 21 and part of the back surface of the bracket 21. According to an exemplary embodiment, the bracket 21 includes an adhesive material or adhesive layer on at least a partial region thereof with which the display panel 100 comes into contact so that the display panel 100 can be fastened to the bracket 21. Furthermore, in an exemplary embodiment, the bracket 21 fastens and supports the sensor 200. In an exemplary embodiment, the bracket 21 includes a depression 25. The depression 25 corresponds to the difference in height between the sensor 200 and the display panel 100.

The PCB 24 is disposed beneath the bracket 21. Various types of electronic parts may be mounted on the PCB 24. For example, one or more electronic devices, circuit lines, etc. may be disposed on the PCB 24, and at least part of these components may be electrically connected to one another. The electronic parts may include, for example, the control unit 60, the memory 70, the wireless transmission and reception unit 80, etc. According to exemplary embodiments, the display drive circuit is disposed on and electrically connected to the PCB 24. Furthermore, a drive circuit configured to drive the sensor 200, a circuit unit configured to process image data output from the sensor 200, etc. may be electrically connected to the PCB 24, or may be disposed on the PCB 24. According to various exemplary embodiments, the PCB 24 may include a plurality of PCBs 24, and at least part of the plurality of PCB 24 may be electrically connected. Furthermore, in an exemplary embodiment, the driver IC 61 and the application processor 62 are disposed on the PCB 24. In an exemplary embodiment, the driver IC 61 includes a circuit unit configured to process fingerprint information output from the sensor 200.

The housing 20 fastens and supports the internal components of the display device 10. According to an exemplary embodiment, the display panel 100, the pin hole array mask layer 400, the sensor 200, the bracket 21, and the PCB 24 are sequentially stacked and seated on the housing 20.

According to exemplary embodiments, at least one surface of the housing 20 includes a metal material. According to an exemplary embodiment, the side surface of the housing 20 includes a metal frame. According to exemplary embodiments, the transparent cover layer 330 is configured to be selectively attached to and separated from the housing 20. According to an exemplary embodiment, the transparent cover layer 330 is coupled to the side surface of the housing 20 in the state of covering the front surface of the housing 20. For example, in an exemplary embodiment, when the transparent cover layer 330 covers the front surface of the housing 20, the transparent cover layer 330 is also coupled to the side surface of the housing 20.

The back cover 22 forms the appearance of the back surface of the display device 10. According to exemplary embodiments, the back cover 22 is configured to be selectively attached to and separated from the housing 20. According to an exemplary embodiment, the back cover 22 is coupled to the side surface of the housing 20 in the state of covering the back surface of the housing 20. For example, in an exemplary embodiment, when the back cover 22 covers the back surface of the housing 20, the back cover 22 is also coupled to the side surface of the housing 20.

According to exemplary embodiments, the display device 10 may omit at least one of the above-described components, or may further include at least one additional component. As described above, in an exemplary embodiment, the display device 10 further includes the touch detection layer 310. The touch detection layer 310 may be stacked between the transparent cover layer 330 and the display panel 100, and may include a touch sensor capable of detecting the contact or approach of a touch object, such as part of the body of a user, an electronic pen, etc. In an exemplary embodiment, the touch detection layer 310 is controlled by the driver IC 61. Furthermore, the display device 10 may further include a battery capable of supplying power to the display device 10.

Individual components of the display device 10 according to an exemplary embodiment of the present disclosure will be described in detail with reference to FIG. 3B.

Referring to FIG. 3B, in an exemplary embodiment, the sensor 200 configured to detect the fingerprint pattern of the finger 40 of a user is disposed beneath the display panel 100. For example, in an exemplary embodiment, the sensor 200 includes an integrated circuit (IC) substrate, and an image detection circuit unit disposed on the IC substrate. In an exemplary embodiment, the sensor 200 is coupled to a circuit substrate 220. The circuit substrate 220 may be, for example, a flexible substrate. The sensor 200 may be, for example, a rear illumination sensor or back side illumination (BSI) image sensor. The sensor 200 may include, for example, a complementary metal-oxide-semiconductor (CMOS), a semiconductor charge-coupled device (CCD) sensor, etc.

The sensor 200 may include various types of filters such as, for example, a red filter, a green filter, a blue filter, etc. Furthermore, the sensor 200 may include a filter configured to block a certain color such as, for example, a red color filter, a green color filter, a blue color filter, etc. Furthermore, the sensor 200 may include a filter configured to block an infrared ray.

Light emitted from the display panel 100 may be directed toward the finger 40 of the user, and light reflected from the finger may be directed toward the sensor 200. For example, the pixels PXs included in the display panel 100 function as a light source required for the image capture of a fingerprint pattern.

The pixels PXs may include, for example, red pixels R, green pixels G, and blue pixels B. Each of the red pixels R, the green pixels G, and the blue pixels B may have a red color filter, a green color filter, or a blue color filter. The pixel PX may further include a white pixel W. The white pixel W may have a white color filter, or may not have a separate filter. However, the display panel 100 is not limited thereto. For example, according to exemplary embodiments, pixels of various colors, an invisible light source (for example, an infrared light (IR) source, or an ultraviolet (UV) light source), and/or different types of light sources may be used in the display panel 100. In an exemplary embodiment, the pixels PXs of the display panel 100 are synchronized with the signal acquisition of the sensor 200. A detailed structure of the display panel 100 will be described below.

In an exemplary embodiment, a protective film 300 is disposed beneath the display layer 100. For example, in an exemplary embodiment, the protective film 300 is disposed between the display layer 100 and the pin hole array mask layer 400. The protective film 300 may be adhered to the bottom of the display layer 100, for example, to the bottom of the substrate, via a sticking agent. The protective film 300 may improve the strength of the display panel 100 and prevent the display panel 100 from being damaged. The protective film 300 may include, for example, a flexible plastic material. Furthermore, the protective film 300 may have various thicknesses according to its Young's modulus.

In an exemplary embodiment, an optically transparent support member 210 is disposed on the sensor 200. The optically transparent support member 210 spaces the pin hole array mask layer 400 and the sensor 200 apart from each other. For example, the optically transparent support member 210 is disposed between the sensor 200 and the pin hole array mask layer 400. In an exemplary embodiment, the support member 210 may be a capping layer configured to protect sensing elements CE of the sensor 200. Optically transparent adhesive layers may be disposed on and/or beneath the optically transparent support member 210.

The pin hole array mask layer 400 is disposed above the sensor 200. For example, in an exemplary embodiment, the distance between the pin hole array mask layer 400 and the sensor 200 is less than or equal to about 1 mm. In an exemplary embodiment, the distance between the pin hole array mask layer 400 and the sensor 200 is between about 0.25 mm and about 4.0 mm. For example, the pin hole array mask layer 400 is disposed on the top surface of the optically transparent support member 210. The pin hole array mask layer 400 is an opaque mask, and has a plurality of pin holes PH configured to allow light to pass through the pin hole array mask layer 400. The pin holes PH may be uniformly spaced apart from one another, or may be spaced apart from one another according to, for example, a honeycomb pattern. The pitch between the pin holes PH may range for example, from about 40 um to about 127 um. In an exemplary embodiment, the pitch between the pin holes PH may range from about 40 um to about 85 um. Furthermore, the width (diameter) of the pin holes PH may range, for example, from about 20 um to about 80 um. Specific numerical values related to the pin hole array mask layer 400 will be described below.

The pin hole array mask layer 400 is opaque, and thus, does not allow light to pass therethrough. In an exemplary embodiment, the pin hole array mask layer 400 provides opacity by including chrome (e.g., a chrome layer). In exemplary embodiments, opacity may be provided by using another material having a layer shape or a material having a shape other than a layer shape.

The display layer 100 is disposed above the pin hole array mask layer 400. As described above, the display layer 100 includes a plurality of pixels PXs configured to display images. For example, the display layer 100 may be part of an organic light-emitting diode (OLED) display panel. The pixels PXs may be spaced apart from one another so that light reflected from a finger can pass therethrough, or may be aligned with the pin holes PH.

In an exemplary embodiment, the touch detection layer 310 is disposed on the display layer 100. For example, the display layer 100 may include a substrate (see 110 of FIG. 5) and a thin film encapsulation layer (see 160 of FIG. 5) disposed on the substrate 110. In this case, the touch detection layer 310 may be located on the thin film encapsulation layer 160 of the display layer 100. For example, the touch detection layer 310 may be located between the thin film encapsulation layer 160 of the display layer 100 and the transparent cover layer 330. For example, the touch detection layer 310 may be stacked and formed directly on the thin film encapsulation layer.

In an exemplary embodiment, the touch detection layer 310 is a touch panel separate from the display panel 100. The touch detection layer 310 may include, for example, a metal touch electrode configured to detect touch, and an insulating film, adhesive layer, or protective film disposed on or beneath the touch electrode.

The transparent cover layer 330 is disposed above the touch detection layer 310. An optically transparent adhesive layer 320 may be disposed between the touch detection layer 310 and the transparent cover layer 330. The transparent cover layer 330 including, for example, onyx or the like, is located above the display layer 100, and defines a finger placement surface configured to accommodate a finger 40 of a user. For example, the transparent cover layer 330 is fastened by the optically transparent adhesive layer 320, and the top surface of the transparent cover layer 330 defines the finger placement surface 331 configured to accommodate the finger 40 of the user.

In an exemplary embodiment, the sensor 200 (e.g., the image detection circuit unit included in the sensor 200) detects an image of the finger 40 of the user or an image of an object disposed adjacent to the finger placement surface 331, and performs one or more biometric functions such as, for example, a user authentication function (a user matching function), a biometric measurement and registration function, and/or a forgery detection function based on the result of the detection. Furthermore, in the case in which the display device 10 has the shape of a touch display (e.g., in the case in which the display device 10 includes the touch detection layer 310), when a user touches the touch display, for example, upon utilizing a navigation function or touch display input, data from the finger 40 of the user may be detected or acquired by the sensor 200 for the purpose of, for example, finger matching and/or forgery detection.

Light from the pixels PXs of the display layer 100 is scattered based on the finger 40 of the user brought into contact with the finger placement surface 331 or positioned slightly above the finger placement surface 331. The scattered light is captured by the sensor 200 via the transparent portions of the display layer 100 and the pin holes PHs of the pin hole array mask layer 400.

Figure 4:
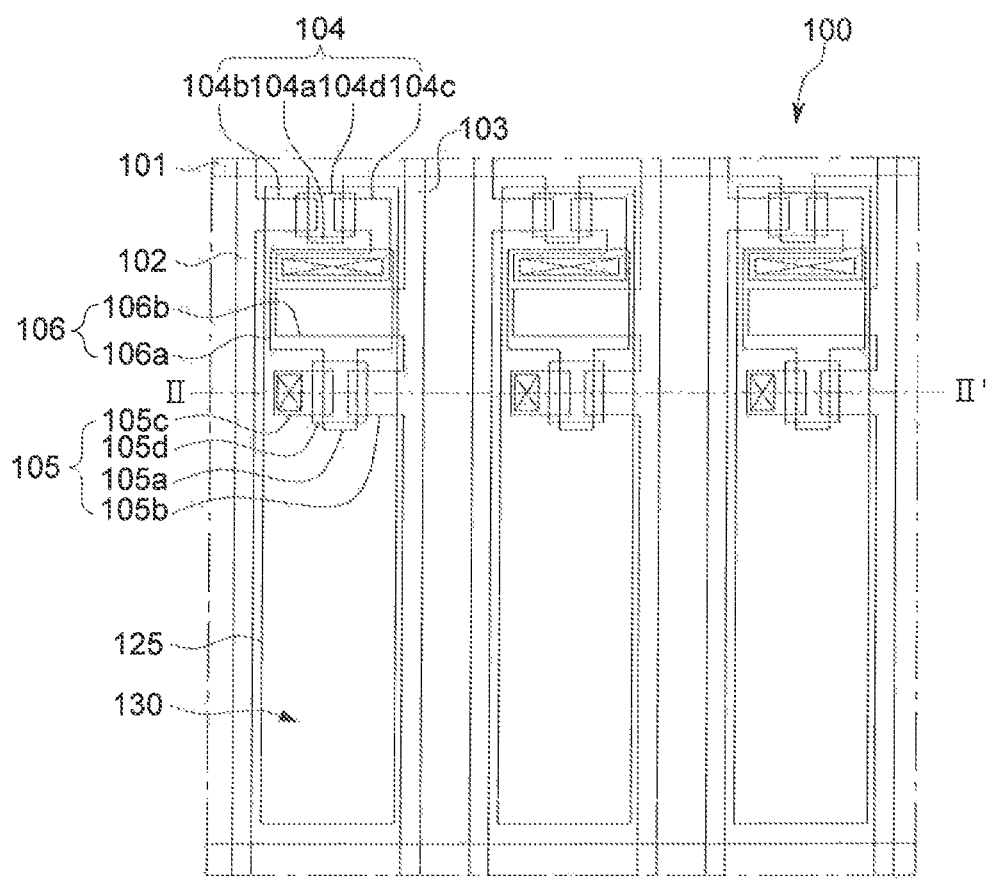
FIGS. 4 and 5 are plan and cross-sectional views of a display device according to an exemplary embodiment of the present disclosure, respectively.
Figure 5:
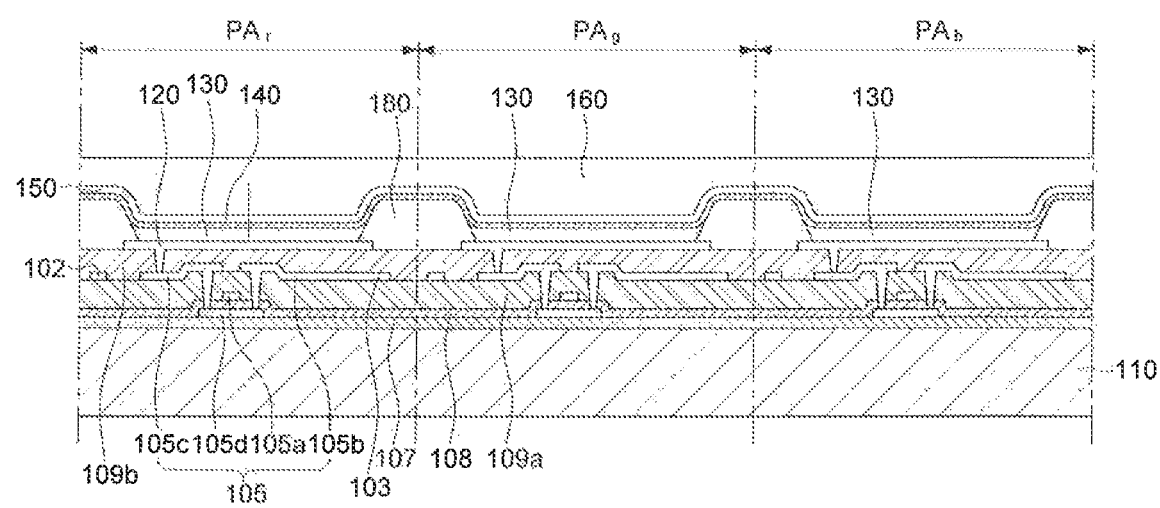

FIGS. 4 and 5 are plan and cross-sectional views of a display device according to an exemplary embodiment of the present disclosure, respectively. FIG. 5 is a cross-sectional view taken along line II-II' of FIG. 4.

Referring to FIGS. 4 and 5, in an exemplary embodiment, the display panel 100 includes gate lines 101 extending in a first direction, data lines 102 and a common power line 103 extending in a second direction and crossing the gate lines 101 in an insulated manner, a switching thin film transistor 104, a drive thin film transistor 105, and a capacitor 106.

Thus, in an exemplary embodiment, each pixel of the display device has a 2-TFT-1-CAP structure including two thin film transistors (TFTs) and one capacitor (CAP) 106. However, each pixel of the display device of the present disclosure is not limited. For example, in exemplary embodiments, each pixel may include three or more thin film transistors and two or more capacitors.

The switching thin film transistor 104 selects a pixel from which light is emitted. The switching thin film transistor 104 includes a switching gate electrode 104a connected to the corresponding gate line 101, a switching source electrode 104b connected to the corresponding data line 102, a switching drain electrode 104c connected to a first capacitive plate 106a, and a switching semiconductor layer 104d.

The drive thin film transistor 105 applies driving power adapted to allow an organic light-emitting layer 125 of the pixel, selected by the switching thin film transistor 104, to emit light. The drive thin film transistor 105 includes a drive gate electrode 105a connected to the first capacitive plate 106a, a drive source electrode 105b connected to the common power line 103, a drive drain electrode 105c connected to a first electrode 120, and a drive semiconductor layer 105d.

The capacitor 106 includes the first capacitive plate 106a and a second capacitive plate 106b. The first capacitive plate 106a is connected to the switching drain electrode 104c and the drive gate electrode 105a, and the second capacitive plate 106b is connected to the common power line 103. The capacitance of the capacitor 106 is determined by the charge stored in the capacitor 106 and the voltage between the first capacitive plate 106a and the second capacitive plate 106b.

A voltage corresponding to the difference between data voltage transferred via the switching thin film transistor 104 and a common voltage applied from the common power line 103 to the drive thin film transistor 105 is stored in the capacitor 106, and a current corresponding to the voltage stored in the capacitor 106 flows to the organic light-emitting layer 125 via the drive thin film transistor 105. As a result, the organic light-emitting layer 125 emits light.

The first substrate 110 may be formed using an insulating substrate including a material selected from, for example, glass, quartz, ceramic, and plastic. However, the first substrate 110 is not limited thereto. For example, in exemplary embodiments, the first substrate 110 may be formed using a metallic material such as, for example, stainless steel or the like.

In an exemplary embodiment, the first substrate 110 includes red, green, and blue pixel regions PAr, PAg and PAb. The red, green, and blue pixel regions PAr, PAg and PAb may be defined by a pixel defining layer 180 to be described below. The red, green, and blue pixel regions PAr, PAg and PAb may be sequentially disposed on the first substrate 110. Furthermore, the first substrate 110 may include white pixel regions.

A buffer layer 107 is disposed on the first substrate 110. The buffer layer 107 may prevent the infiltration of moisture or impurities through the first substrate 110, and may also flatten the surface of the first substrate 110. The buffer layer 107 may be formed using an inorganic insulating film or organic insulating film. The buffer layer 107 may be deposited on the first substrate 110 by means of various deposition methods such as, for example, plasma enhanced chemical vapor deposition (PECVD), atmospheric pressure CVD (APCVD), or Low Pressure CVD (LPCVD), by using, for example, $SiO_2$, $SiN_x$, etc. However, the buffer layer 107 is not limited thereto. For example, in exemplary embodiments, the buffer layer 107 may be removed as desired.

The drive semiconductor layer 105d is disposed on the buffer layer 107, and includes a source region, a drain region, and a channel region disposed therebetween.

A gate insulating film 108 is disposed on the buffer layer 107. The gate insulating film 108 covers the drive semiconductor layer 105d, and prevents the infiltration of moisture or impurities through the first substrate 110. The gate insulating film 108 includes an insulating material, and may be formed in a single layer or multiple layers including, for example, silicon nitride $SiN_x$ or silicon oxide $SiO_x$. However, the gate insulating film 108 is not limited thereto. For example, in exemplary embodiments, the gate insulating film 108 may be formed using one of various insulating materials.

The drive gate electrode 105a is disposed on the gate insulating film 108. An interlayer insulating film 109a is disposed on the gate insulating film 108 and covers the drive gate electrode 105a.

The drive source and drive drain electrodes 105b and 105c are spaced apart from each other on the interlayer insulating film 109a. The drive source and drive drain electrodes 105b and 105c come into contact with the source and drain regions of the drive semiconductor layer 105d through opening regions formed through the gate insulating film 108 and the interlayer insulating film 109a.

A protective layer 109b is disposed on the interlayer insulating film 109a and covers the drive source and drive drain electrodes 105b and 105c. The protective layer 109b protects the drive thin film transistor 105, and may be formed using an inorganic insulating film or organic insulating film.

The first electrode 120, an organic light-emitting layer 130, and a second electrode 140 are sequentially disposed on the protective layer 109b. The first electrode 120 may be, for example, an anode configured to inject holes, and the second electrode 140 may be, for example, a cathode configured to inject electrons. However, the first electrode 120 and the second electrode 140 are not limited thereto. For example, in an exemplary embodiment, the first electrode 120 may be a cathode and the second electrode 140 may be an anode.

The organic light-emitting layer 130 may include a low molecular weight or high molecular weight organic material. The organic light-emitting layer 130 may include, for example, red, green, and blue organic light-emitting layers. The red, green, and blue organic light-emitting layers may be disposed on the red, green, and blue pixel regions PAr, PAg and PAb, respectively. In this case, color filters may be provided. Alternatively, the organic light-emitting layer 130 may include an organic light-emitting layer of a single color.

The display panel 100 according to an exemplary embodiment of the present disclosure described with reference to FIGS. 4 and 5 has a top emission type structure. Accordingly, the first electrode 120 may be formed using a reflective film, and the second electrode 140 may be formed using a transflective film.

Each of the reflective film and the transflective film may include one or more metals of, for example, titanium (Ti), magnesium (Mg), silver (Ag), gold (Au), calcium (Ca), lithium (Li), chrome (Cr), and aluminum (Al), or an alloy thereof. The reflective film and the transflective film are distinguished from each other by their thicknesses. In an exemplary embodiment, the transflective film has a thickness equal to or less than about 200 nm. Furthermore, each of the reflective film and the transflective film may have a multilayer structure, including a metal layer inclusive of one or more metals or an alloy of metals, and a transparent conductive oxide (TCO) layer stacked on the metal layer.

The first electrode 120 may further include a transparent conductive film. The transparent conductive film may be formed using a transparent conductive oxide (TCO) material such as, for example, indium tin oxide (ITO), indium zinc oxide (IZO), zinc oxide (ZnO), or indium oxide ($In_2O_3$).

The first electrode 120 may have a structure formed using a reflective film, a double film structure including a reflective film and a transparent conductive film, or a triple film structure in which a transparent conductive film, a reflective film, and a transparent conductive film are sequentially stacked on top of one another. However, the first electrode 120 is not limited thereto. For example, in exemplary embodiments, the first electrode 120 may have a structure formed using a transparent conductive film.

The second electrode 140 may have a structure formed using a transparent conductive film. When the second electrode 140 is formed using a transparent conductive film, the second electrode 140 may become an anode configured to inject holes, and the first electrode 120 may be formed using a reflective film and become a cathode.

The pixel defining layer 180, which covers the edges of the first electrode 120 and which includes a predetermined opening configured to expose the center portion of the first electrode 120, is disposed on the first electrode 120. For example, in an exemplary embodiment, the first electrode 120, the organic light-emitting layer 130, and the second electrode 140 are sequentially stacked within the opening of the pixel defining layer 180. In an exemplary embodiment, the organic light-emitting layer 130 and the second electrode 140 are formed on the pixel defining layer 180.

A capping layer 150 is disposed on the second electrode 140. The capping layer 150 protects the first electrode 120, the organic light-emitting layer 130, and the second electrode 140. In addition, the capping layer 150 helps cause light generated in the organic light-emitting layer 130 to be efficiently emitted to the outside.

The thin film encapsulation layer 160 is disposed on the capping layer 150. The thin film encapsulation layer 160 seals the first electrode 120, the organic light-emitting layer 130, the second electrode 140, and the capping layer 150, and protects these elements from the infiltration of external moisture, oxygen, etc.

The thin film encapsulation layer 160 may have a structure in which one or more organic layers and one or more inorganic layers are alternately disposed. However, the thin film encapsulation layer 160 is not limited thereto. For example, in an exemplary embodiment, the thin film encapsulation layer 160 may be formed in a single layer such as, for example, an organic or inorganic layer.

In an exemplary embodiment, red, green, and blue color filters are provided, and are disposed in red, green, and blue pixel regions PAr, PAg and PAb on the thin film encapsulation layer 160, respectively.

Furthermore, as described above, in an exemplary embodiment, the protective film 300 is disposed below the substrate 110. When color filters are provided, the touch detection layer 310 may be disposed above the color filters.

In an exemplary embodiment, the touch detection layer 310 is disposed on the thin film encapsulation layer 160, and color filters and a planarization film are disposed on the touch detection layer 310.

Figure 6:
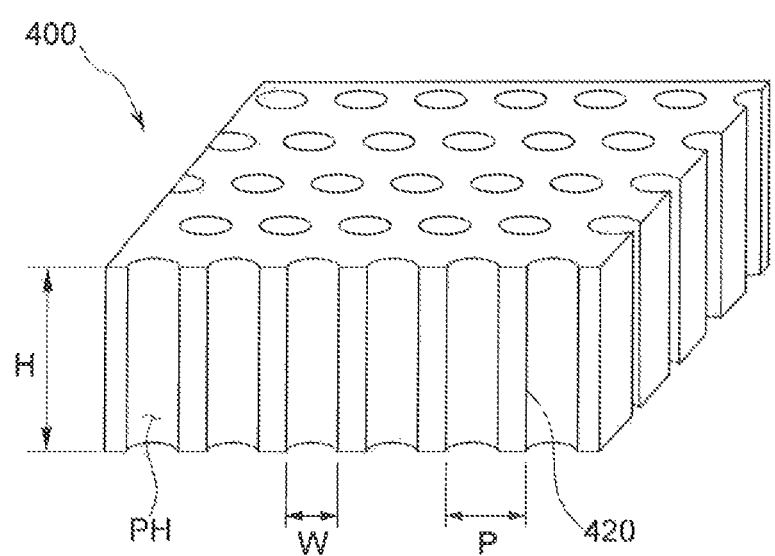
FIGS. 6 and 7 illustrate the pin hole array mask layer and an enlarged pin hole of the display device according to an exemplary embodiment of the present disclosure, respectively.
Figure 7:
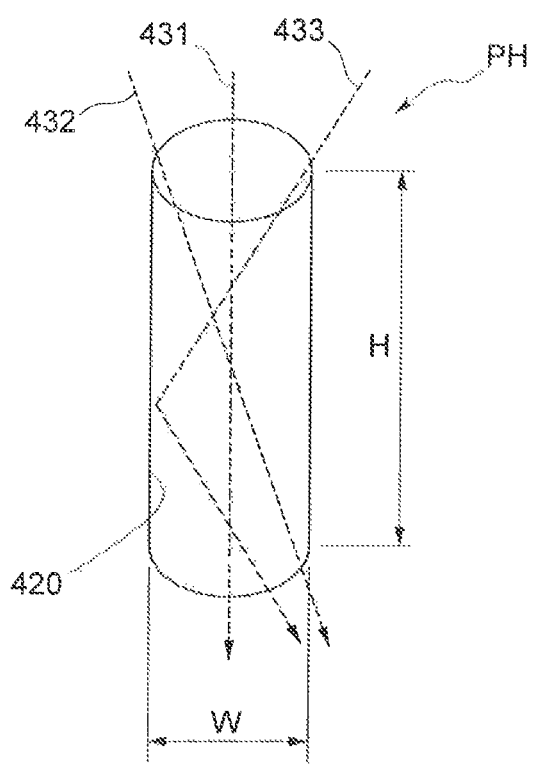

FIGS. 6 and 7 illustrate the pin hole array mask layer and an enlarged pin hole of the display device according to an exemplary embodiment of the present disclosure, respectively.

The pin hole array mask layer 400 includes regularly arranged openings (e.g., pin holes PHs). Each of the pin holes PHs has a width (diameter) of W and a height (the thickness of the pin hole array mask layer 400) of H. In an exemplary embodiment, the pin holes PHs are arranged at predetermined pitches P. The pin holes PHs are openings which pass through the opaque pin hole array mask layer 400. The pin holes PH may be filled with a transparent material.

Of the rays of light scattered by the user's finger 40, rays of light 431 and 432 each incident at an angle about equal to or larger than a predetermined angle with respect to the pin hole array mask layer 400, e.g., only an almost vertical ray of light, pass through the pin hole PH, and a ray of light 433 incident at an inclined angle smaller than a predetermined angle with respect the pin hole array mask layer 400 is blocked. The angle of light which can pass through the pin hole PH may be determined based on the ratio of the height H of the pin hole PH to the width W thereof. According to an exemplary embodiment of the present disclosure, the ratio of the height H of the pin hole PH to the width W thereof may be considerably large such that light scattered at one point of the finger 40 can pass through one pin hole PH, for example, only a pin hole PH located vertically below the point, but does not pass through another adjacent pin hole PH. For example, the ratio may have a value ranging from 5 to 20. However, the ratio is not limited thereto. For example, in an exemplary embodiment, the ratio may have a value ranging from 1 to 100.

Light incident onto the pin hole PH at an angle smaller than a predetermined angle may be totally reflected from the inner circumferential surface 420 of the pin hole PH and captured by the sensor 200, which may degrade the quality and resolution of a captured fingerprint image. According to an exemplary embodiment of the present disclosure, the inner circumferential surfaces 420 of the pin holes PH may be subjected to non-gloss processing such that the total reflection of light can be reduced.

The non-gloss processing includes physical processing such as, for example, plasma processing, sand blasting, etc., and chemical processing. For example, the non-gloss processing may be a vacuum etching method, a surface buffing method, a sandpaper polishing method, a method of forming a black complex based on a chemical agent, etc.

Figure 8:
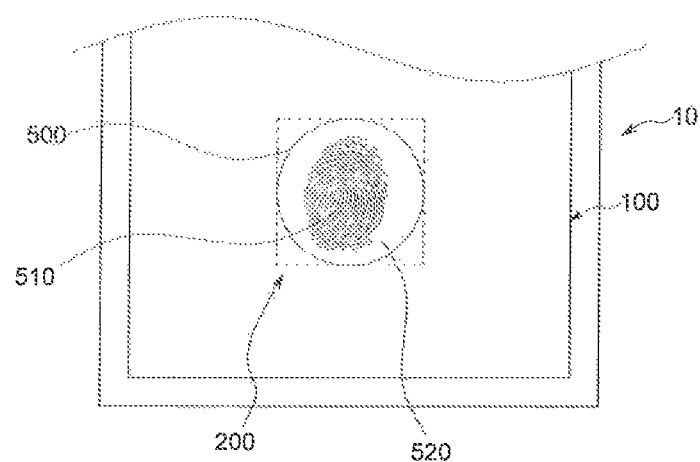
FIG. 8 is a view showing the display device on which a fingerprint recognition region is displayed according to an exemplary embodiment of the present disclosure.
Figure 9:
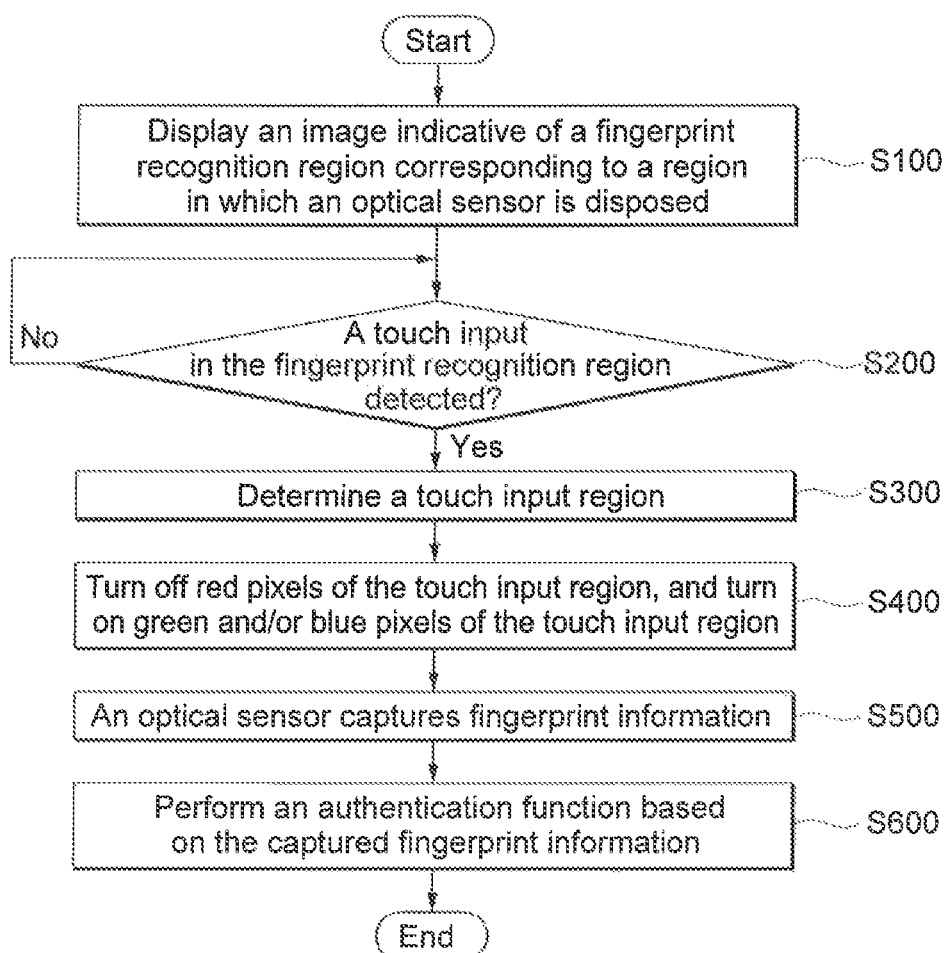
FIG. 9 is a flowchart showing a method by which the display device captures a fingerprint image according to an exemplary embodiment of the present disclosure.

FIG. 8 is a view showing the display device on which a fingerprint recognition region is displayed according to an exemplary embodiment of the present disclosure. FIG. 9 is a flowchart showing a method by which the display device captures a fingerprint image according to an exemplary embodiment of the present disclosure.

Referring to FIGS. 8 and 9, when fingerprint recognition is required, for example, when an application requiring user authentication is run, an image 500 indicative of a fingerprint recognition region is displayed in the display region 100 under control of the control unit 60 at operation S100. The fingerprint recognition region corresponds to a region in which the sensor 200 is disposed, for example, a region in which a fingerprint can be recognized when the finger 40 is placed on or near the region. For example, the sensor 200 defines the fingerprint recognition region. The region in which a fingerprint can be recognized may overlap part or all of the display region 100. The image 500 may overlap part or all of the fingerprint recognition region. In an exemplary embodiment, the image 500 is not displayed.

The touch detection layer 310 detects the touch of the input finger 40 within the fingerprint recognition region at operation S200.

When a touch input is detected, the control unit 60 determines a region in which a touch has been input at operation S300. For example, as shown in FIG. 8, the control unit 60 determines a region 510 within the fingerprint recognition region in which a touch has been input, and a region 520 within the fingerprint recognition region in which a touch has not been input.

In an exemplary embodiment, to enable the sensor 200 to accurately capture of the fingerprint image, the control unit 60 stops the light emission of the red pixels in the region 510 (e.g., the region in which a touch has been input) and causes only the green pixels and/or blue pixels in the region 510 to emit light at operation S400. In an exemplary embodiment, the green pixels and/or blue pixels emit light in the region 510 at operation S400 at the maximum brightness. In this case, in an exemplary embodiment, the region 520 in which a touch has not been input continues to display the same image that was already being displayed before the touch detection process began. Accordingly, since light sources used for the recognition of a fingerprint emit light only in the region 510 in which the touch has been input (e.g., a region covered by the finger 40), the light emitted in the region 510 when the user's finger 40 is on or close to the region 510 is not viewed by the user. Accordingly, although the red pixels do not emit light in region 510, the user does not detect a change in the displayed image.

The sensor 200, which is synchronized with the light emission of the green pixels and/or blue pixels, captures fingerprint information at operation S500. As described above, since only the green pixels and/or blue pixels emit light in the region 510 when a fingerprint image is being captured, only green and/or blue light is incident upon the sensor 200, and red light is not incident upon the sensor 200.

The driver IC 61 converts the fingerprint information captured by the sensor 200 into an image, and then encrypts the image. A method of encrypting the image will be described in further detail below.

In an exemplary embodiment, the control unit 60 performs a user authentication function based on the image acquired through the capture of the sensor 200 and the conversion and encryption of the driver IC 61 at operation S600.

Figure 10:
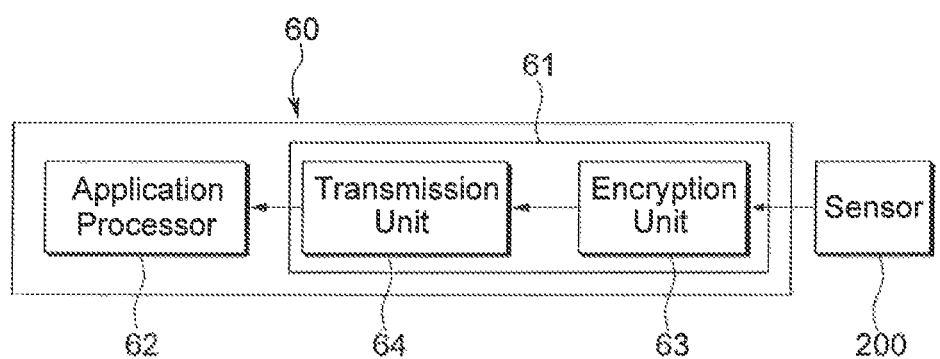
FIG. 10 is a view showing a relationship between the sensor and control unit of FIG. 2.

FIG. 10 illustrates a relationship between the sensor and control unit of FIG. 2.

The sensor 200 recognizes a fingerprint, generates information about the fingerprint, and transmits the information about the fingerprint to the driver IC 61. The driver IC 61 encrypts the information recognized by the sensor 200, and transmits the recognized information to the application processor 62. The fingerprint information recognized by the sensor 200 is converted into an image and encrypted by the encryption unit 63. A method by which the encryption unit 63 encrypts the fingerprint information will be described in further detail below. The encrypted data is converted into data to be transmitted to the application processor 62 by the transmission unit 64.

The transmission unit 64 converts the data encrypted by the encryption unit 63 into data used for transmission on the physical layer of a mobile industry processor interface (MIPI) to transmit the encrypted data by using the MIPI. To transmit the converted data, the physical layer adds data indicative of the start and end of the actual data to the actual data, and then performs serial-parallel conversion.

The physical layer may employ D-PHY, and may use a differential pair method to implement a serial method and a high-speed interface in order to simplify the configuration of hardware.

According to exemplary embodiments, the sensor 200 may be, for example, an optical sensor, a capacitive sensor, an ultrasonic sensor, a heat sensor, etc.

Figure 11A:
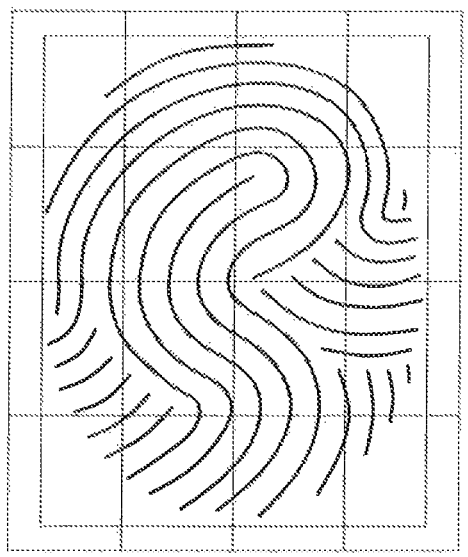
FIGS. 11A and 11B are views showing a method by which the display device encrypts fingerprint information according to an exemplary embodiment of the present disclosure.
Figure 11B:
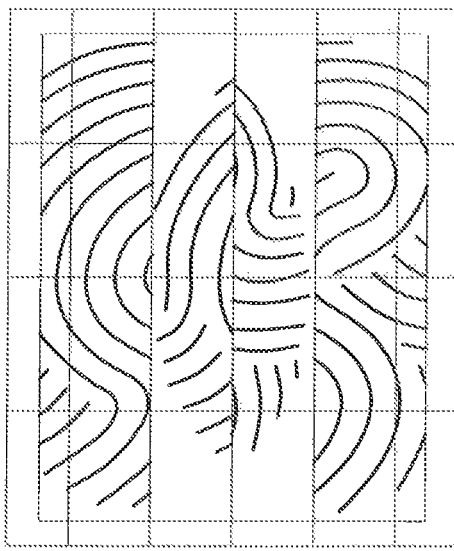

FIGS. 11A and 11B are views showing a method by which the display device encrypts fingerprint information according to an exemplary embodiment of the present disclosure.

Referring to FIG. 11A, the driver IC 61 acquires fingerprint information from the fingerprint sensor 200 of the display, converts the acquired fingerprint information into fingerprint image data, and segments the fingerprint image data into an image having a size of four horizontal sub-blocks×four vertical sub-blocks. However, exemplary embodiments of the present disclosure are not limited thereto. For example, in exemplary embodiments, the number of horizontal sub-blocks may be larger than four, and the number of vertical sub-blocks may be larger than four.

In an exemplary embodiment, an encryption option is applied to the segmented fingerprint image region. The encryption option may be previously designated by a user, or may be randomly selected when encryption is applied. Furthermore, in connection with the encryption option, only a single option or a plurality of options may be selected.

The encryption option may include, for example, a flip encryption option, a location change encryption option, a brightness change encryption option, a noise mix encryption option, a hashing encryption option, a filtering encryption option, etc.

FIG. 11B is a view showing the application of the location change option of the encryption options of the display device according to an exemplary embodiment of the present disclosure.

Referring to FIGS. 3A and 11B, the driver IC 61 changes the locations of sub-blocks of the image having a size of four horizontal sub-blocks×four vertical sub-blocks by using the location change option, and notifies the application processor 62 that the location change option has been selected.

When the location change option is used, the driver IC 61 notifies the application processor 62 of the previous and current locations of each sub-block, and the application processor 62 performs decryption in a reverse manner.

For example, in an exemplary embodiment, when data is transmitted in the format of (1,4):(3,2), the data means that a sub-block which is placed at a location first from a left side and fourth from an upper end is moved to a location third from the left end and second from the upper end by the application of the location change option. The application processor 62 performs decryption by moving a sub-block at a location third from the left side and second from the upper end to its original location first from the left side to fourth from the upper end.

Furthermore, encryption may be applied to location change option information itself which is transferred to the application processor 62.

In an exemplary embodiment, the application processor 62 encrypts the decrypted fingerprint data using its own method. Alternatively, in an exemplary embodiment, the application processor 62 receives the fingerprint data encrypted by the driver IC 61, and re-encrypts the data encrypted by the driver IC 61 without performing decryption. In this case, previously registered fingerprint data is also data obtained by re-encrypting data encrypted by the driver IC 61. Upon user authentication, the application processor 62 performs authentication by comparing the previously registered fingerprint data with the data obtained by re-encrypting the data encrypted by the driver IC 61.

In an exemplary embodiment, when the application processor 62 decrypts and encrypts the data encrypted by the driver IC 61, the previously registered fingerprint data includes data obtained by decrypting and encrypting the data encrypted by the driver IC 61 by means of the application processor 62 and then registering the data.

In an exemplary embodiment, when a user is authenticated, the application processor 62 performs authentication by comparing the previously registered fingerprint data with the data obtained by decrypting the data encrypted by the driver IC 61 and encrypting the decrypted data.

Information about whether the application processor 62 re-encrypts or decrypts and then encrypts the data encrypted by the driver IC 61 may be previously stored, or may be determined by a user and then stored.

Figure 12A:
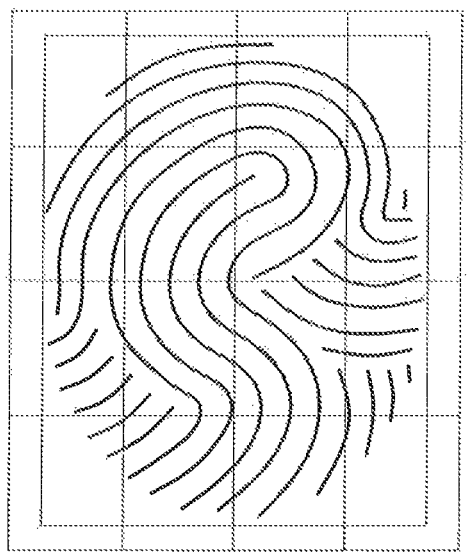
FIGS. 12A to 12C are views showing a method by which the display device encrypts fingerprint information according to an exemplary embodiment of the present disclosure.
Figure 12B:
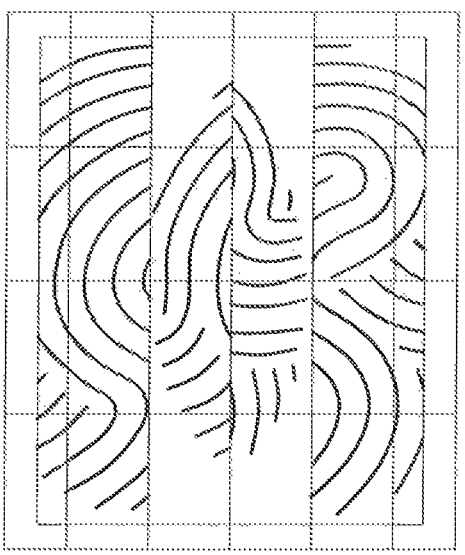
Figure 12C:
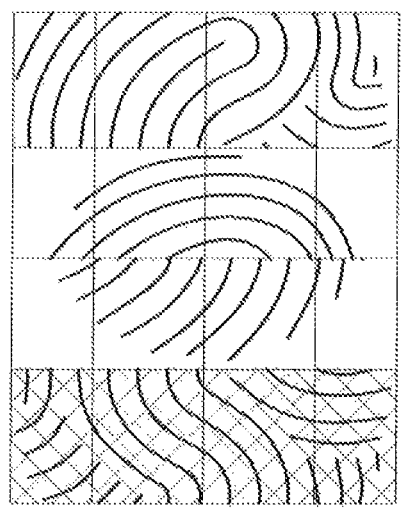

FIGS. 12A to 12C are views showing a method by which a display device encrypts fingerprint information according to an exemplary embodiment of the present disclosure.

Referring to FIGS. 12A to 12C, in an exemplary embodiment, the fingerprint information encryption method applies encryption in a duplicate manner.

For example, in an exemplary embodiment, the driver IC 61 acquires fingerprint data from the fingerprint sensor 200 of the display, and segments the acquired fingerprint image data into an image having a size of four sub-blocks×four sub-blocks.

A location change encryption option is applied to the segmented fingerprint data (see FIG. 12B).

In an exemplary embodiment, the location change encryption option is configured to move each sub-block of the image having a size of four sub-blocks×four sub-blocks, or move sub-blocks on a row or column basis. Furthermore, the location change encryption option may include rotation.

FIG. 12B shows a result in which location changes have been made on a column basis such that sub-blocks in a column first from a left side have been interchanged with sub-blocks at a column second from the left side, and sub-blocks in a column third from the left side have been interchanged with sub-blocks at a column fourth from the left side. Furthermore, rotation may be additionally performed on the result of the location change.

When encryption is performed, a plurality of options may be selected, and encryption may be performed a plurality of times based on the plurality of selected options. FIG. 12C shows a result in which the result of the location change has been rotated to the right by 90 degrees and encryption has been applied to the rotated result by using filters for individual rows in a stepwise manner. The filters may be any one of, for example, a diffuse glow filter, a displace filter, a glass filter, a ripple filter, a pinch filter, a twirl filter, a wave filter, a zigzag filter, a spherize filter, etc.

In an exemplary embodiment, different filters may be used for respective sub-blocks, respective rows, or respective columns. In this case, the driver IC 61 transmits information about the filters used for the respective sub-blocks, respective rows, or respective columns, to the application processor 62. The information about the filters is information about filters used (e.g., the type of filters) and the strengths of the filters.

In an exemplary embodiment, the application processor 62 performs decryption by using, for example, Distort filter information, a location change, and rotation information, which are received from the driver IC 61. In an exemplary embodiment, the application processor 62 authenticates a user by comparing fingerprint data generated by performing decryption on fingerprint data encrypted by the application processor 62 itself and previously registered.

Alternatively, in an exemplary embodiment, without performing separate decryption, the application processor 62 re-encrypts the data encrypted by the driver IC 61. In this case, the level of security can be increased by comparing previously registered, encrypted fingerprint information with encrypted, input fingerprint information.

Figure 13A:
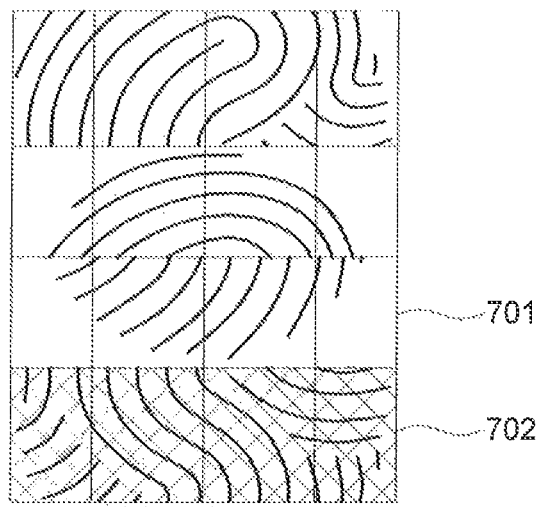
FIGS. 13A to 13C are views showing a method by which the display device performs encryption using filters according to an exemplary embodiment of the present disclosure.
Figure 13B:
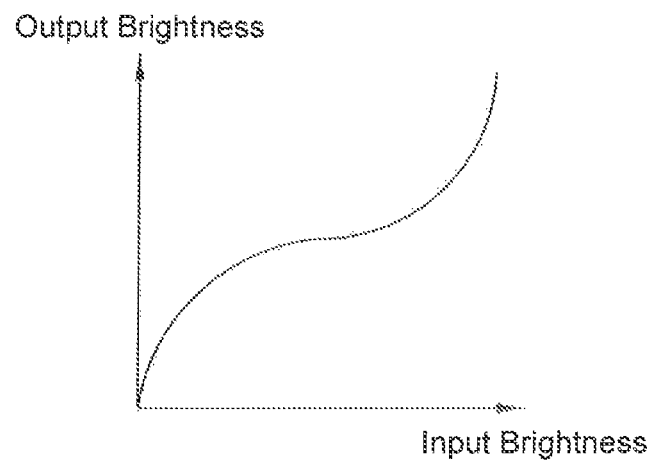
Figure 13C:

FIGS. 13A to 13C are views showing a method by which the display device performs encryption by using filters according to an exemplary embodiment of the present disclosure.

FIG. 13A shows the result of the filtering of a fingerprint image using first and second filters. FIG. 13B is a view showing a relationship between the input brightness and output brightness of a fingerprint image when the first filter is used.

FIG. 13A shows the result 701 of the application of the first filter to one row of a fingerprint image and the result 702 of the application of the second filter to one row of the fingerprint image.

The first filter, based on a point at which the input brightness of a pixel of the fingerprint image is intermediate, increases output brightness for a pixel of the fingerprint image in which the input brightness falls between 0 and an intermediate value, and decreases output brightness for a pixel of the fingerprint image in which the input brightness falls between the intermediate value and the highest value.

FIG. 13C shows the encryption method of the second filter.

The second filter converts the RGB data of each pixel of the fingerprint image into YCrCb data, and then mixes part of the components of Cb data and part of the components of Cr data. For example, when the Cb data or Cr data has an 8-bit value, the lower four bits of the Cb data and the lower four bits of the Cr data may be interchanged with each other.

Thereafter, the second filter converts the YCrCb data of each pixel of the fingerprint image into RGB data, and transmits the RGB data.

Figure 14A:
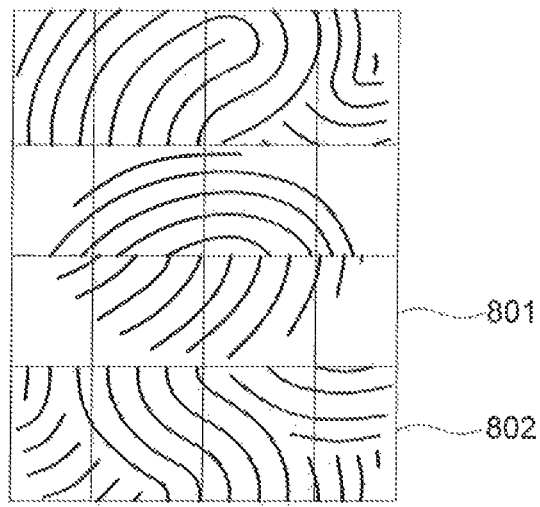
FIGS. 14A to 14C are views showing a method by which the display device performs decryption using inverse filters according to an exemplary embodiment of the present disclosure.
Figure 14B:
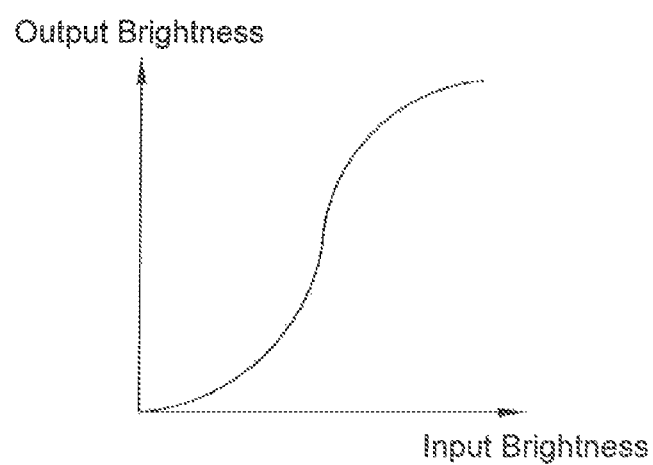
Figure 14C:

FIGS. 14A to 14C are views showing a method by which the display device performs decryption by using inverse filters according to an exemplary embodiment of the present disclosure.

FIG. 14A shows the inverse conversion result of the filtering of a fingerprint image using first and second inverse filters.

FIG. 14B is a view showing a relationship between the input brightness and output brightness of the fingerprint image when the first inverse filter is used.

FIG. 14A shows the result 801 of the application of the first inverse filter to one row of the fingerprint image and the result 802 of the application of the second filter to one row of the fingerprint image.

The first inverse filter, based on a point at which the input brightness of a pixel of the fingerprint image is intermediate, decreases the output brightness of a pixel of the fingerprint image in which the input brightness falls between 0 and an intermediate value, and increases the output brightness of a pixel of the fingerprint image in which the input brightness falls between the intermediate value and the highest value.

FIG. 14C shows the decryption method of the second inverse filter.

The second inverse filter converts the RGB data of each pixel of a received, encrypted fingerprint image into YCbCr data, and mixes part of the components of Cb data and part of the components of Cr data. For example, when the Cb data or Cr data has an 8-bit value, the lower four bits of the Cb data and the lower four bits of the Cr data may be interchanged with each other. Thus, the second inverse filter is operated using a method opposite to the filtering method of the second filter.

The second inverse filter converts the YCrCb data of each pixel of the fingerprint image into RGB data, and transmits the RGB data.

Figure 15:
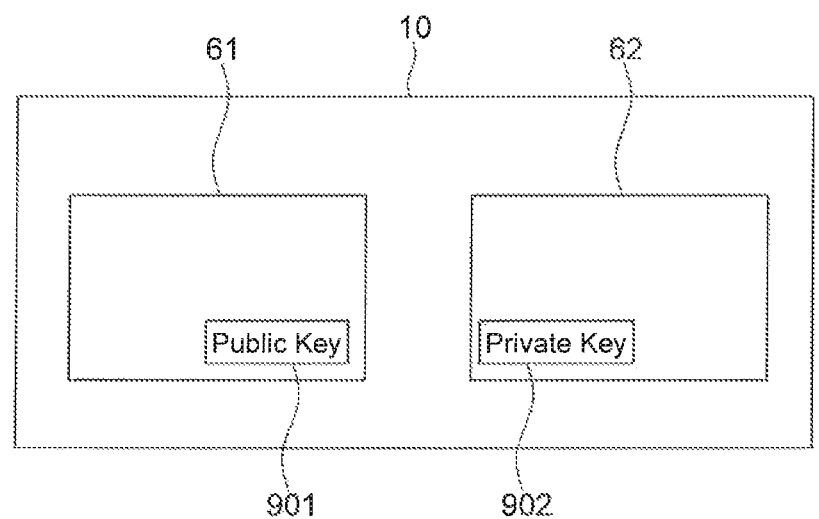
FIG. 15 is a view showing a method by which the display device performs encryption using asymmetric keys according to an exemplary embodiment of the present disclosure.

FIG. 15 is a view showing a method by which the display device performs encryption by using asymmetric keys according to an exemplary embodiment of the present disclosure.

Referring to FIG. 15, a public key and a private key for the encryption of fingerprint information are generated. A public key 901 and a private key 902 are keys used for an asymmetric encryption method. According to exemplary embodiments, Rivest-Shamir-Adleman (RSA), Diffie-Hellman key exchange, elliptic curve cryptography (ECC), etc. are used.

The public key 901 is a key used for the encryption of the fingerprint information, and the private key 902 is a key used for the decryption of the encrypted fingerprint information.

In an exemplary embodiment, the public key 901 and the private key 902 are generated when the display device is first operated. In an exemplary embodiment, the public key 901 and the private key 902 are generated in response to the selection of a menu option on a user interface by a user. In the case in which the public key 901 and the private key 902 are generated when the display device is first operated, the public key 901 and the private key 902 may be generated, for example, using serial numbers or specific numbers designated by a manufacturing company.

In the case in which the user selects a menu option on the user interface, when the user inputs specific secret numbers, the public key 901 and the private key 902 are generated accordingly.

The generated public key 901 is stored in the driver IC 61. The driver IC 61 may include, for example, nonvolatile memory, such as flash memory, for the input, output and storage of data. In an exemplary embodiment, the generated public key 901 is stored in the nonvolatile memory of the driver IC 61.

The generated private key 902 is stored in the application processor 62. The application processor 62 may include, for example, nonvolatile memory, such as flash memory, for the input, output and storage of data. In an exemplary embodiment, the generated private key 902 is stored in the nonvolatile memory of the application processor 62.

In an exemplary embodiment, encryption is performed on the public key 901 and the private key 902 themselves. For example, a specific encryption method or encoding method may be performed on the public key 901 and the private key 902. The driver IC 61 and the application processor 62 may store an encrypted or encoded public key 901 or private key 902. For example, when the public key 901 is the binary number "10," 00_10_00 may be generated by multiplying each digit of the public key 901 and each digit of 11. The generated number has the number of digits determined in advance. The public key 901 is the binary number "10," and the first two digits and the last two digits are not present. Accordingly, when the public key 901 is multiplied by 11, the first two digits and the last two digits are all generated as 00.

The public key 901 encoded into 00_10_00 is decoded by adding 0 to each digit of the public key 901. For example, when 0 is added to each digit of the public key 901, the public key is encoded into 00_10_00, 00_10_00. Furthermore, since 00 is ignored, 00 of the first two digits and 00 of the last two digits are discarded to be decoded, and the remaining number "10" is used as the public key 901.

The driver IC 61 encrypts the pixel data of the fingerprint image received from the fingerprint sensor by using the public key 901. The pixel data of the fingerprint image is represented in the form of RGB data or YUV data, and the driver IC 61 may encrypt part or all of pixel data. For example, only R data or Y data of each pixel may be encrypted, and RGB data or YUV data of each pixel may be encrypted.

The driver IC 61 transmits the pixel data of the encrypted fingerprint image to the application processor 62. The pixel data of the transmitted encrypted fingerprint image may be data obtained by encrypting part or all of the pixel data.

The application processor 62 decrypts the pixel data of the encrypted fingerprint image by using the stored private key 902. In this case, the pixel data of the encrypted fingerprint image to be decrypted may be data obtained by encrypting part or all of the pixel data.

In this case, the private key 902 and the public key 901 are stored in the application processor and the driver IC 61, respectively. As a result, in exemplary embodiments, it is not necessary for the driver IC 61 and the application processor 62 to transmit the private key 902 and the public key 901 for the purpose of encryption or decryption.

Figure 16:
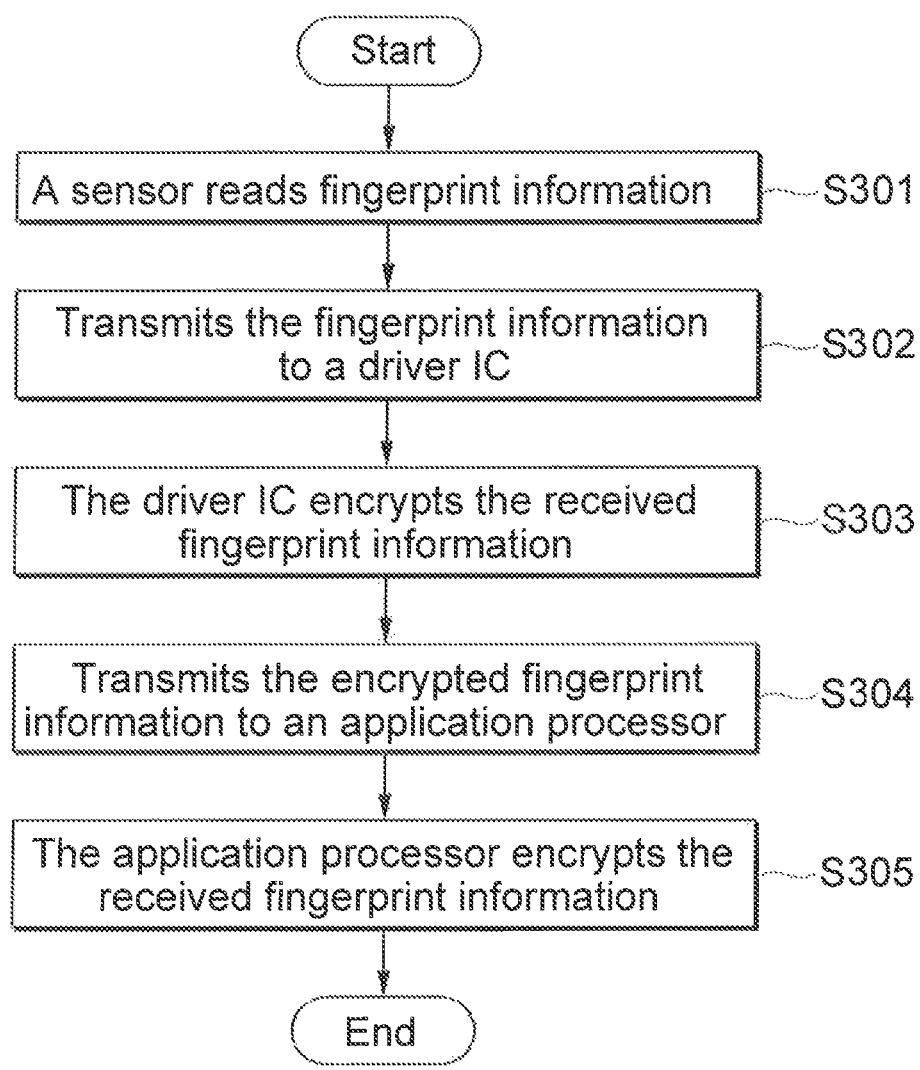
FIG. 16 is a flowchart of a method by which the display device encrypts fingerprint information according to an exemplary embodiment of the present disclosure.

FIG. 16 is a flowchart of a method by which the display device encrypts fingerprint information according to an exemplary embodiment of the present disclosure.

Referring to FIGS. 3A and 16, the fingerprint sensor 200 reads fingerprint recognition information at operation S301, and transmits the fingerprint recognition information to the driver IC 61 at operation S302. As described above, the fingerprint sensor 200 may be, for example, an optical sensor or a capacitive sensor.

The encryption unit 63 of the driver IC 61 converts the received fingerprint recognition information into an image and encrypts the image at operation S303.

The driver IC 61 transmits the encrypted fingerprint information to the application processor 62 at operation S304. The application processor 62 may decrypt and then encrypt received fingerprint information at operation S305, or may re-encrypt received encrypted fingerprint data.

The display device according to exemplary embodiments of the present disclosure recognizes fingerprint information in the display panel, encrypts the fingerprint information using the display panel's own method, and then transmits the encrypted fingerprint information to the application processor, thereby reducing the risk that personal fingerprint information is divulged and obtained by an unintended party.

Referring to a display device according to a comparative example (e.g., a display device included in a mobile device such as a smartphone), fingerprint information is detected by a fingerprint sensor of the display device, and is transmitted to an AP of the display device in an unencrypted format. The AP encrypts the unencrypted fingerprint information once the AP receives the unencrypted fingerprint information. However, transmitting the fingerprint information to the AP before the fingerprint information is encrypted results in the risk that the fingerprint information is divulged and obtained by an unintended party. For example, if the security of a mobile device including the display device is compromised, or if the mobile device is stolen or lost and is in the physical possession of someone other than the owner, the fingerprint information can be obtained by an unintended party, since the fingerprint information can be intercepted while being transmitted to the AP in an unencrypted format.

Exemplary embodiments of the present disclosure improve upon such a conventional display device by configuring the driver IC of a display device to encrypt the fingerprint information before it is transmitted to the AP. For example, rather than the driver IC being limited to typical driving operations of the display device (e.g., transmitting scan signals to pixels, transmitting data signals to pixels, etc.), in exemplary embodiments of the present disclosure, the driver IC is further configured to encrypt the fingerprint information before it is transmitted to the AP, as discussed in detail above. Thus, exemplary embodiments of the present disclosure provide a display apparatus having improved security.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A display device, comprising:
    a plurality of pixels;
    a plurality of gate signal lines extending in a first direction and connected to the plurality of pixels;
    a plurality of data signal lines extending in a second direction and connected to the plurality of pixels, wherein the second direction crosses the first direction;
    a fingerprint sensor configured to detect fingerprint information;
    a driver integrated circuit (IC) configured to transmit a plurality of scan signals to the pixels via the gate signal lines, transmit a plurality of data signals to the pixels via the data signal lines, receive the fingerprint information from the fingerprint sensor, and encrypt the received fingerprint information; and
    an application processor configured to receive the encrypted fingerprint information from the driver IC,
    wherein the driver IC converts the fingerprint information into an image, segments the image into a plurality of sub-blocks, selects an encryption option for each of the sub-blocks, and performs the selected encryption option on each of the sub-blocks.

2. The display device of claim 1, wherein the fingerprint sensor is an optical sensor, a capacitive sensor, an ultrasonic sensor, or a heat sensor.

3. The display device of claim 1, wherein the fingerprint information is encrypted by the driver IC before being transmitted from the driver IC to the application processor.

4. The display device of claim 3, wherein the driver IC transmits the selected encryption option to the application processor.

5. The display device of claim 4, wherein the application processor decrypts the encrypted fingerprint information using the received encryption option.

6. The display device of claim 3, wherein the encryption option is one of a flip encryption option, a location change encryption option, a brightness change encryption option, a noise mix encryption option, a hashing encryption option, and a filtering encryption option.

7. The display device of claim 6, wherein the filtering encryption option utilizes one of a diffuse glow filter, a displace filter, a glass filter, a ripple filter, a pinch filter, a twirl filter, a wave filter, a zigzag filter, and a spherize filter.

8. The display device of claim 1, wherein the driver IC converts the fingerprint information into an image, encrypts the image using a public key, and transmits the encrypted image to the application processor.

9. The display device of claim 8, wherein the application processor decrypts the encrypted image using a private key.

10. The display device of claim 1, wherein the application processor re-encrypts the encrypted fingerprint information.

11. A method of operating a display device, comprising:
transmitting, by a driver integrated circuit (IC) of the display device, a plurality of scan signals to a plurality of pixels via a plurality of gate signal lines;
transmitting, by the driver IC, a plurality of data signals to the pixels via a plurality of data signal lines, wherein the gate signal lines extend in a first direction and are connected to the pixels, the data lines extend in a second direction and are connected to the pixels, and the second direction crosses the first direction;
detecting, by a fingerprint sensor of the display device, fingerprint information;
receiving, by the driver IC, the fingerprint information from the fingerprint sensor;
encrypting, by the driver IC, the received fingerprint information; and
transmitting the encrypted fingerprint information from the driver IC to an application processor of the display device,
wherein the driver IC converts the fingerprint information into an image, segments the image into a plurality of sub-blocks, selects an encryption option for each of the sub-blocks, and performs the selected encryption option on each of the sub-blocks.

12. The method of claim 11, wherein the fingerprint sensor is an optical sensor, a capacitive sensor, an ultrasonic sensor, or a heat sensor.

13. The method of claim 11, wherein the fingerprint information is encrypted by the driver IC before being transmitted from the driver IC to the application processor.

14. The method of claim 13, wherein the driver IC transmits the selected encryption option to the application processor.

15. The method of claim 14, wherein the application processor decrypts the encrypted fingerprint information using the received encryption option.

16. The method of claim 13, wherein the encryption option is one of a flip encryption option, a location change encryption option, a brightness change encryption option, a noise mix encryption option, a hashing encryption option, and a filtering encryption option.

17. The method of claim 16, wherein the filtering option utilizes one of a diffuse glow filter, a displace filter, a glass filter, a ripple filter, a pinch filter, a twirl filter, a wave filter, a zigzag filter, and a spherize filter.

18. The method of claim 11, wherein the driver IC converts the fingerprint information into an image, encrypts the image using a public key, and transmits the encrypted image to the application processor.

19. The method of claim 18, wherein the application processor decrypts the encrypted image using a private key.

20. The method of claim 11, wherein the application processor re-encrypts the encrypted fingerprint information.

* * * * *